US007031695B2

(12) United States Patent
Aono et al.

(10) Patent No.: US 7,031,695 B2
(45) Date of Patent: Apr. 18, 2006

(54) PORTABLE TERMINAL, ACCESS CONTROL METHOD, AND ACCESS CONTROL PROGRAM

(75) Inventors: Hiroshi Aono, Yokosuka (JP);
Kazuhiko Ishii, Yokohama (JP);
Kensaku Mori, Yokohama (JP);
Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 349 days.

(21) Appl. No.: 10/420,844

(22) Filed: Apr. 23, 2003

(65) Prior Publication Data

US 2003/0220097 A1 Nov. 27, 2003

(30) Foreign Application Priority Data

Apr. 23, 2002 (JP) ............................ P2002-121080

(51) Int. Cl.
*H04M 1/66* (2006.01)
(52) U.S. Cl. .................... 455/411; 455/414.1
(58) Field of Classification Search ............... 455/410, 455/411, 414.1, 414.2, 422.1; 379/218.01
See application file for complete search history.

(56) References Cited

U.S. PATENT DOCUMENTS

2002/0046353 A1* 4/2002 Kishimoto
2002/0095588 A1* 7/2002 Shigematsu et al.
2003/0194071 A1* 10/2003 Ramian

FOREIGN PATENT DOCUMENTS

| EP | 1 107 623 | 6/2001 |
| GB | 2 315 954 | 2/1998 |
| WO | WO 01/35621 | 5/2001 |

OTHER PUBLICATIONS

Y. Isobe, et al., Proceedings of the 34th Hawaii International Conference on System Sciences, XP-002252204, pp. 4039-4047, "Development of Personal Authentication System Using Fingerprint With Digital Signature Technologies", Jan. 6, 2001.

J. Press, ICL Technical Journal, vol. 6 No. 4, XP-000094905, pp. 681-693, "An Introduction to Public Key Systems and Digital Signatures", Nov. 1, 1989.

* cited by examiner

Primary Examiner—William J. Deane, Jr.
(74) Attorney, Agent, or Firm—Oblon, Spivak, McClelland, Maier & Neustadt, P.C.

(57) ABSTRACT

A portable terminal 10 according to the present invention is provided with a request acquiring means, a verifying means, and an output means. The request acquiring means acquires an access right authentication request from a display application 153 to a telephone directory management application 152 managing telephone directory data stored in a telephone directory database 151, along with application authentication information held by the display application 153. The verifying means determines the validity of the application authentication information in accordance with the access right authentication request. When it is determined that the application authentication information is valid, the output means permits the access right authentication request and outputs the telephone directory data to the display application 153 in accordance with an access request to the telephone directory data.

20 Claims, 7 Drawing Sheets

| | 151a | 151b | 151c | 151d | 151e |
|---|---|---|---|---|---|

| NAME | KANA | PHONE NUMBER | MAIL ADDRESS | GROUP NAME |
|---|---|---|---|---|
| ○○ TARO | ○○ TARO | 090-1234-5678 | taro@***.ne.jp | A |
| △△ JIRO | △△ JIRO | 090-0987-6543 070-3456-7890 | jiro@***.ne.jp | B |
| ×× SABURO | ×× SABURO | 090-8475-2837 | saburo@***.ne.jp | B |

Fig.4

| Subject | TYPE OF CERTIFICATE | ACCESSIBLE INFORMATION |
|---|---|---|
| CERTIFICATE OF APPLICATION A (CN=aaa,···) | * | ALL TELEPHONE DIRECTORY DATA |
| CERTIFICATE OF APPLICATION B (CN=bbb,···) | CERTIFICATE 1 | ALL TELEPHONE DIRECTORY DATA BELONGING TO GROUP B |
| * | CERTIFICATE 1 CERTIFICATE 2 CERTIFICATE 3 — | TELEPHONE NUMBERS IN GROUP B ALL TELEPHONE DIRECTORY DATA OF GROUP B MAIL ADDRESSES NO DATA |

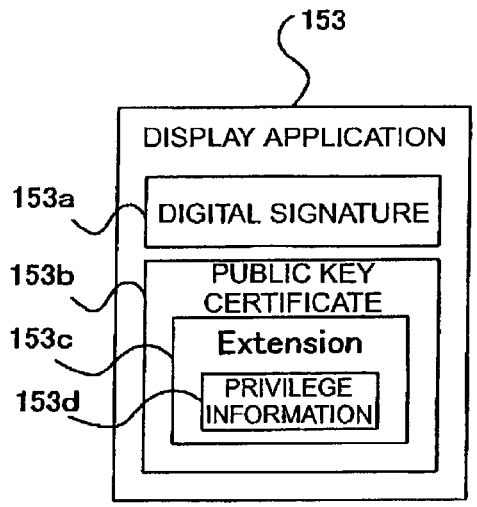

Fig.5

PORTABLE TERMINAL, ACCESS CONTROL METHOD, AND ACCESS CONTROL PROGRAM

BACKGROUND OF THE INVENTION

1. Field of the Invention

The present invention relates to a portable terminal, an access control method, and an access control program.

2. Related Background Art

In recent years, portable terminals having a telephone directory in which a variety of personal information including names, telephone numbers, mail addresses, etc. is registered in the form of electronic data are in practical use. A user of a portable terminal can enter a telephone number and a mail address into predetermined areas by an easy operation of selecting a name of a desired communication correspondent, using the telephone directory. The telephone directory is normally managed by an application program dedicated to management of the telephone directory preliminarily recorded in the portable terminal (the application program will be referred to hereinafter as "telephone directory management application").

SUMMARY OF THE INVENTION

However, the above prior art had the problem as described below. Namely, since a number of personal information items are registered in the telephone directory, it is necessary to secure a certain level of security by preventing leakage and falsification of the registered information. It is thus conceivable to employ a method of storing the telephone directory inside a tamper-resistant device like an IC card or the like, thereby permitting only access from the telephone directory management application and rejecting all access from other application programs.

However, types of application programs downloadable into the portable terminals are rapidly increasing in recent years with increase in the capacity of data stored in the portable terminals and with development of radio communication technologies. Among such application programs, there are programs having functions that necessitate reference to the personal information registered in the telephone directory for the valid reason. To reject the reference to the telephone directory against access from such application programs is undesirable in terms of making effective use of the functions of the portable terminals and application programs and improving ease of use.

In view of the above circumstances, an object of the present invention is therefore to realize a portable terminal, an access control method, and an access control program permitting access to the telephone directory data from application programs while maintaining high security.

In order to solve the above problem, a portable terminal according to the present invention is a portable terminal comprising: telephone directory data storing means for storing telephone directory data; request acquiring means for acquiring an access right authentication request to a telephone directory management application program managing the telephone directory data stored in the telephone directory data storing means, from another application program, along with application authentication information held by the application program; verifying means for determining validity of the application authentication information in accordance with the access right authentication request acquired by the request acquiring means; and output means configured so that when the verifying means determines that the application authentication information is valid, the output means admits the access right authentication request and outputs the telephone directory data to the application program in accordance with a request for access to the telephone directory data.

An access control method according to the present invention is an access control method in which a portable terminal acquires an access request from an application program, the access control method comprising: a request acquiring step wherein the portable terminal acquires an access right authentication request to a telephone directory management application program managing the telephone directory data stored in telephone directory data storing means of the portable terminal, from another application program, along with application authentication information held by the application program; a verifying step wherein the portable terminal determines validity of the application authentication information in accordance with the access right authentication request acquired in the request acquiring step; and an output step wherein when it is determined in the verifying step that the application authentication information is valid, the portable terminal admits the access right authentication request and outputs the telephone directory data to the application program in accordance with a request for access to the telephone directory data.

An access control program according to the present invention is an access control program for making a portable terminal configured to acquire an access request from an application program, execute the following processes: a process of acquiring an access right authentication request to a telephone directory management application program managing the telephone directory data stored in telephone directory data storing means of the portable terminal, from another application program, along with application authentication information held by the application program; a verifying process of determining validity of the application authentication information in accordance with the access right authentication request thus acquired; and an output process of admitting the access right authentication request when it is determined that the application authentication information is valid, and outputting the telephone directory data to the application program in accordance with the access request to the telephone directory data.

According to these aspects of the invention, when it is determined that the application authentication information, which was acquired along with the access right authentication request from the other application program to the telephone directory management application program managing the telephone directory data, is valid, the telephone directory data is outputted to the application program in accordance with the request for access to the telephone directory data. Namely, the portable terminal admits an access right authentication request from an application program with valid application authentication information but rejects an access right authentication request from an application program without valid application authentication information. Then the portable terminal admits the request for access to the telephone directory data from the application program whose access right authentication request was admitted. This makes it feasible to implement the access to the telephone directory data from application programs while maintaining high security in the portable terminal.

In the portable terminal according to the present invention, preferably, the application authentication information includes a digital signature and a public key certificate.

In the access control method according to the present invention, preferably, the application authentication information includes a digital signature and a public key certificate.

According to these aspects of the invention, the application authentication information includes the digital signature and the public key certificate. When the portable terminal is configured to determine the validity of the application program having requested the access right authentication, based on the combination of the digital signature with the public key certificate, the access control can be performed with higher degree of accuracy. As a consequence, it becomes feasible to implement the access to the telephone directory data from the application program while maintaining a higher security level in the portable terminal.

In the portable terminal according to the present invention, preferably, the application authentication information further includes an attribute certificate.

In the access control method according to the present invention, preferably, the application authentication information further includes an attribute certificate.

The privilege information of the public key certificate (information to be referred to in determining the validity of the application program) is fixed within a period of validity, whereas for the privilege information of the attribute certificate the user is allowed to set a period of validity independent of the public key certificate. According to these aspects of the invention, therefore, the user can readily change the privilege information of the certificate, without need for a procedure of reissuing another certificate.

The portable terminal according to the present invention may be constructed in a configuration further comprising: physical information storing means for storing a physical information item indicating a physical feature of a principal; and determining means for collating the physical information item stored in the physical information storing means, with a physical information item of a user having made the access right authentication request, to determine the identity of the physical information items, wherein when the determining means determines that the physical information items are identical with each other, the request acquiring means acquires user authentication information reflecting the result of the determination, wherein the verifying means determines validity of the user authentication information in accordance with the access right authentication request acquired by the request acquiring means, and wherein when the verifying means determines that the user authentication information is valid, the output means admits the access right authentication request and outputs the telephone directory data to the application program in accordance with the request for access to the telephone directory data.

The access control method according to the present invention may be configured as a method further comprising a determining step wherein the portable terminal collates a physical information item indicating a physical feature of a principal, stored in physical information storing means of the portable terminal, with a physical information item of a user having made the access right authentication request, to determine the identity of the physical information items, wherein the request acquiring step is configured so that when it is determined in the determining step that the physical information items are identical with each other, the portable terminal acquires user authentication information reflecting the result of the determination, wherein the verifying step is configured so that the portable terminal determines validity of the user authentication information in accordance with the access right authentication request acquired in the request acquiring step, and wherein the output step is configured so that when it is determined in the verifying step that the user authentication information is valid, the portable terminal admits the access right authentication request and outputs the telephone directory data to the application program in accordance with the request for access to the telephone directory data.

According to these aspects of the invention, when it is determined that the physical information item of the principal (a regular subscriber of the portable terminal) is identical with the physical information item of the user having made the access right authentication request, the telephone directory data is outputted to the application program in accordance with the access request from the application program. Namely, the portable terminal performs personal identification with reference to the physical information, so as to admit the access right authentication request based on a command of the principal but reject the access right authentication request based on a command of any other person than the principal. This enables the access control in combination of the application program authentication with the user authentication and makes it feasible to further raise the security level on the occasion of making access to the telephone directory data.

In the portable terminal according to the present invention, preferably, the physical information items are fingerprint information items.

In the access control method according to the present invention, preferably, the physical information items are fingerprint information items.

According to these aspects of the invention, the fingerprint information items (e.g., data of characteristic points of a fingerprint) are used as information indicating the physical feature of the principal, for the personal identification of the user having made the access right authentication request. Accordingly, through such an easy operation that the user lets a fingerprint reader read a fingerprint of a finger, the portable terminal can perform accurate personal identification, as compared with the authentication methods making use of a personal identification number or a password. The physical information used for the user authentication is not limited to the fingerprint information, but may be, for example, information about the iris or retina of the eye, a voice spectrum, a face image, or the like. Such user authentication making use of the physical information is extremely resistant in principle to spoofing and further improves the accuracy of personal identification.

In the portable terminal according to the present invention, more preferably, the access right authentication request is a display right authentication request of the telephone directory data to the telephone directory management application program, the access request is a request for display of the telephone directory data, and the output means makes display means display the telephone directory data in accordance with the display request.

In the access control method according to the present invention, more preferably, the access right authentication request is a display right authentication request of the telephone directory data to the telephone directory management application program, the access request is a request for display of the telephone directory data, and the output means makes display means display the telephone directory data in accordance with the display request.

Among the telephone directory data, a considerable number of telephone directory data can implement the functions intrinsic thereto only when displayed (or visualized) on display means, like names, kana characters, and so on.

Therefore, in the case of such telephone directory data in particular, it is expected that the access right authentication request to the telephone directory data will be a display right authentication request of the telephone directory data. The access request is also expected to be a display request of the telephone directory data. For this reason, the telephone directory data is read out of the telephone directory data storing means of the portable terminal and displayed on the display means, whereby the user of the portable terminal is allowed to view the telephone directory data.

In the portable terminal according to the present invention, more preferably, the access right authentication request is a request for authentication of a call origination right to a telephone number included in the telephone directory data, to the telephone directory management application program, the access request is a request for origination of a call to the telephone number, and the output means has a call originated to the telephone number in accordance with the call origination request.

In the access control method according to the present invention, more preferably, the access right authentication request is a request for authentication of a call origination right to a telephone number included in the telephone directory data, to the telephone directory management application program, the access request is a request for origination of a call to the telephone number, and the output step is configured so that the portable terminal has a call originated to the telephone number in accordance with the call origination request.

The telephone directory data contains telephone numbers, and the telephone numbers can present the effect intrinsic to their function in many cases only when calls are originated to the telephone numbers. Therefore, in the case of the telephone numbers in particular, it is expected that the access right authentication request to the telephone directory data is a call origination right authentication request to a telephone number. Likewise, the access request is expected to be a call origination request to a telephone number. For this reason, the telephone number is read out of the telephone directory data storing means of the portable terminal and dialed, whereby the telephone number becomes effective to use of the user of the portable terminal.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a conceptual diagram showing the configuration of the access list.

FIG. 5 is a conceptual diagram showing a configuration example of the display application.

DESCRIPTION OF THE PREFERRED EMBODIMENTS

A portable terminal according to the present invention will be described below with reference to the accompanying drawings.

Figure 1A:
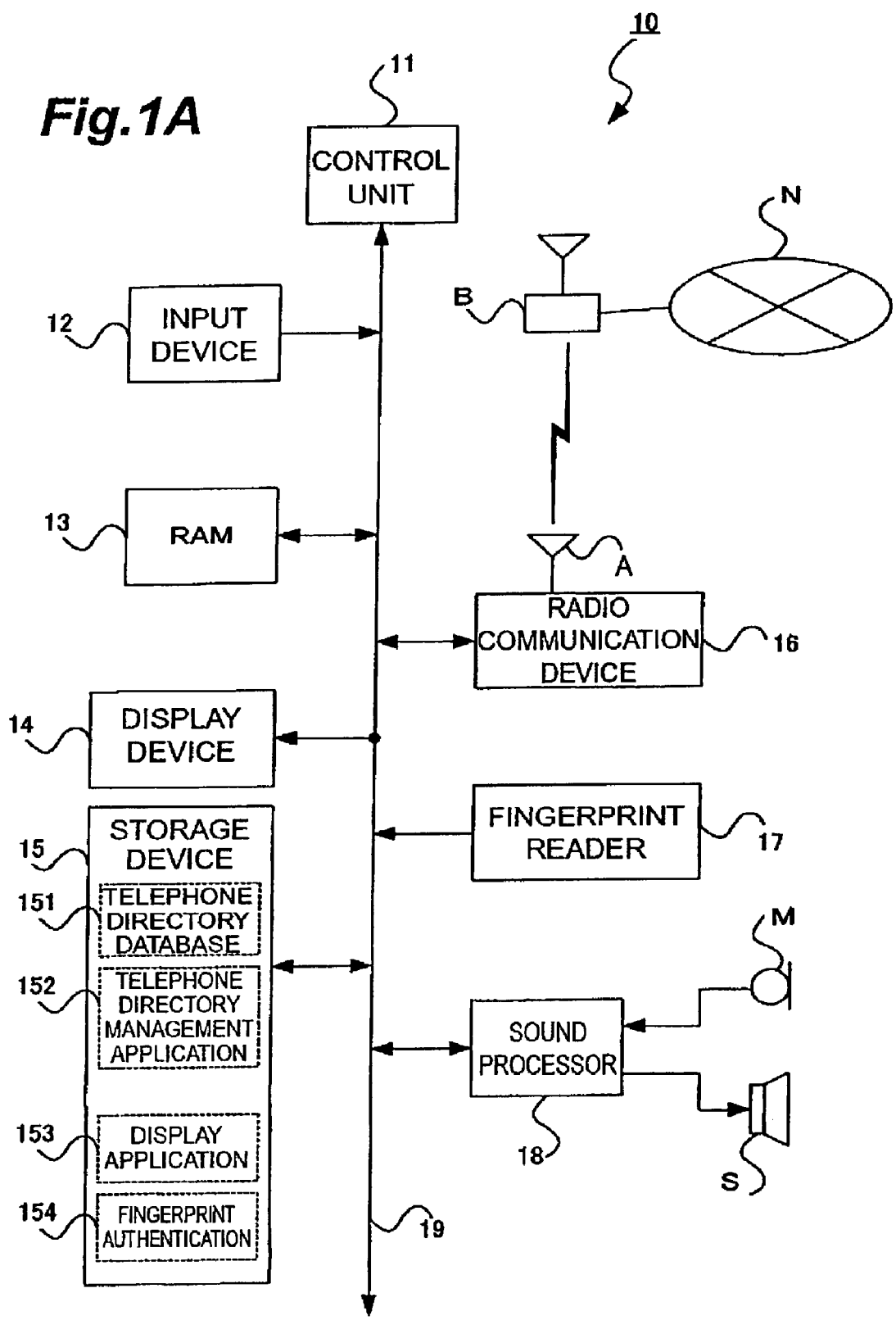
FIG. 1A is a diagram showing the configuration of the portable terminal, and FIG. 1B a diagram showing the functional configuration of the control unit.

The configuration will be described first. FIG. 1A is a block diagram showing the functional configuration of portable terminal 10. The portable terminal 10 is comprised of a control unit 11, an input device 12, a RAM 13, a display device 14, a storage device 15, a radio communication device 16, a fingerprint reader 17, and a sound processing device 18. These devices each are electrically connected through bus 19 so as to be able to send and receive various signals to and from each other.

The control unit 11 is configured to retrieve a program from the storage device 15 into the RAM 13 and perform concentrated control over each part according to the program. Specifically, the control unit 11 executes a variety of processing including an access control process to telephone directory data (e.g., telephone numbers) stored in telephone directory database 151 described later, in accordance with an input signal from the input device 12 and the program retrieved into the RAM 13, and temporarily saves the result of the processing in the RAM 13. Then it stores the processing result saved in the RAM 13, into a predetermined area inside the storage device 15 according to need.

Figure 1B:
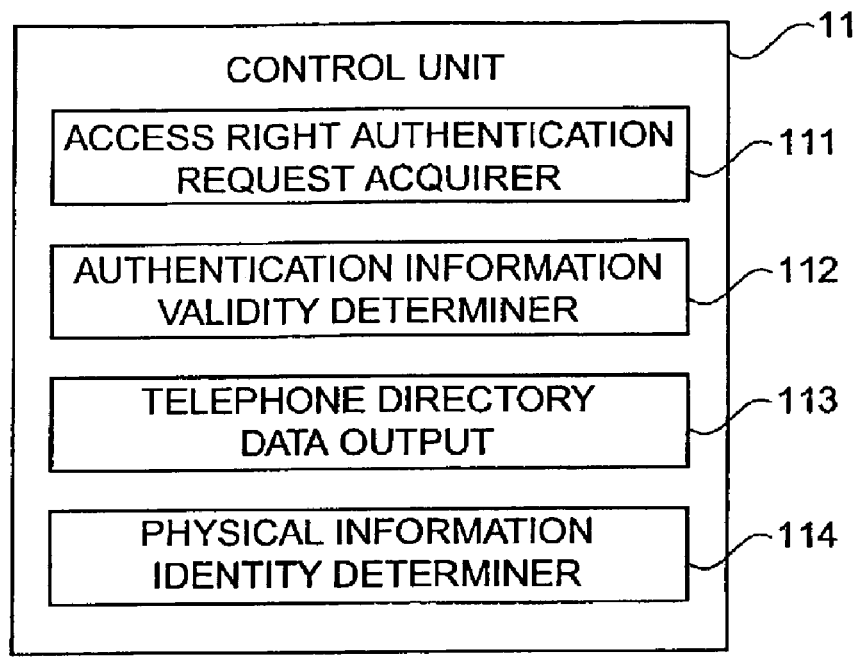

FIG. 1B is a diagram showing the functional configuration of the control unit 11. As shown in FIG. 1B, the control unit 11 is provided with an access right authentication request acquirer 111, an authentication information validity determiner 112, a telephone directory data output 113, and a physical information identity determiner 114. The above parts correspond to the request acquiring means, verifying means, output means, and determining means, respectively, of the portable terminal according to the present invention.

The input device 12 is provided with various operation buttons for ordering selection of data and processing, ON/OFF of power, etc., and these various operation buttons are depressed alone or in combination to output an input signal according to a command to the control unit 11. The input device 12 is constructed of a transparent screen (so called a touch screen) in which devices for sensing contact with a finger or a dedicated pen are arranged on a display screen of display device 14, and is configured to output input signals according to coordinates of contact points to the control unit 11. The way of sensing contacts can be any method, e.g., a pressure-sensitive method of sensing change in pressure, an electrostatic method of sensing electric signals based on static electricity, and so on.

The RAM (Random Access Memory) 13 is constructed of a volatile semiconductor memory and is configured to temporarily save a program retrieved from the storage device 15 described below or data during the various processing executed by the control unit 11. The RAM 13 also has the function of VRAM (Video RAM) for temporarily saving data to be displayed on the display device 14.

The display device 14 is constructed of an LCD (Liquid Crystal Display), an EL (Electro Luminescence) device, or the like and is configured to display data on its screen in accordance with display signals from the control unit 11. The touch screen as the input device 12 as described above is laid over the screen of the display device 14.

The storage device 15 is constructed of a nonvolatile semiconductor memory such as an EEPROM (Electrically Erasable and Programmable ROM), and is configured to store data necessary for execution of various processing, data generated as a result of execution of the various processing, and so on.

The storage device 15 has the telephone directory database 151. The telephone directory database 151 stores data of names, kana characters, telephone numbers, mail addresses, group names, etc. (hereinafter referred to collectively as "telephone directory data") registered by telephone directory management application 152 to be hereinafter described. The telephone directory data is displayed on the display device 14 by a predetermined application program (e.g., a display application 153). Preferably, the telephone directory data is encrypted data. The telephone directory database 151 is located in a non-tamper area so as to accept access from application programs permitted to access the telephone directory data.

Figures 2, 3:
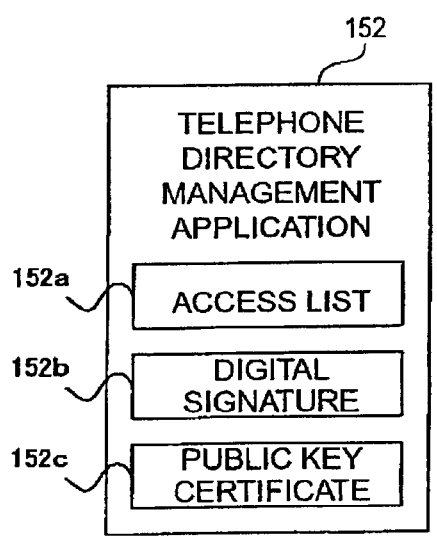
FIG. 2 is a diagram showing a configuration example of the telephone directory database.
FIG. 3 is a conceptual diagram showing a configuration example of the telephone directory management application.

FIG. 2 is a configuration diagram showing a data storage example inside the telephone directory database 151. As shown in FIG. 2, the telephone directory database 151 has a name storage area 151$a$, a kana storage area 151$b$, a telephone number storage area 151$c$, a mail address storage area 151$d$, and a group name storage area 151$e$. These storage areas each store the telephone directory data of names (e.g., "∘∘ taro". . . ), kana characters (e.g., "∘∘ taro". . . ), telephone numbers (e.g., "090-1234-5678". . . ), mail addresses (e.g., "taro@***.ne.jp". . . ), and group names (e.g., "A". . . ), which are stored in correspondence with each other. The kana storage area 151$b$ is an area in which kana characters indicating the reading of Chinese characters or English notations corresponding to Chinese characters are stored according to need in the case where names of Chinese characters are stored in the name storage area 151$a$.

The storage device 15 also stores an application program for performing management of registration, calling, etc. of the telephone directory data stored in the telephone directory database 151 (the application program will be referred to as "telephone directory management application 152"). This telephone directory management application 152 is based on tamper-resistant software, in order to enhance confidentiality and make falsification and unauthorized use harder.

FIG. 3 is a configuration example of the telephone directory management application 152. As shown in FIG. 3, the telephone directory management application 152 has an access list 152$a$, a digital signature 152$b$, and a public key certificate 152$c$.

The access list 152$a$ is a data list in which certificates indicating access authorities to the telephone directory data and information items that can be outputted (accessible) according to an access request from application programs are stored in correspondence to each other. Here the access request according to the present invention embraces a request for readout of data as an object and also embraces a request for display of data and a request for origination of a call.

A configuration example of the access list will be described below in detail with reference to FIG. 4. FIG. 4 is a diagram showing a data storage example of the access list 152$a$. As shown in FIG. 4, the access list 152$a$ has a Subject area 152$d$, a certificate type area 152$e$, and an accessible information area 152$f$.

The Subject area 152$d$ stores data of certificates (e.g., CN=aaa . . . , CN=bbb . . . ) held by application programs expected to make an access request to the telephone directory data have. The symbol "*" stored in the Subject area 152$d$ indicates that data of a certificate held by an application program having requested access is data except for the data of the certificates exemplified above.

The certificate type area 152$e$ stores data indicating types of the certificates stored in the Subject area 152$d$ (e.g., "*," "certificate 1," "certificates 1, 2, 3, −") The symbol "*" stored in the certificate type area 152$e$ indicates that a corresponding certificate is one of a type permitted to access all the telephone directory data stored in the telephone directory database 151. In addition, "−" indicates that an application program having requested access has neither of the certificates.

Furthermore, the accessible information area 152$f$ stores accessible information by the corresponding types of certificates (e.g., "all telephone directory data," "all telephone directory data belonging to group B," "telephone numbers of group B"). This permits the portable terminal 10 to properly select the telephone directory data accessible from an application program in accordance with a type of a certificate held by the application program having requested access.

Returning to FIG. 3, the digital signature 152$b$ is an electronic signature issued and added by a certification organization being a third party, in order to ensure the validity of the telephone directory management application 152 and clearly demonstrate the place of origin thereof. The digital signature 152$b$ is preferably an encrypted signature in view of prevention of leakage.

The public key certificate 152$c$ is a known public key certificate defined according to the predetermined specification (e.g., the specification compliant with X.509) set by ITU-T.

Furthermore, the storage device 15 stores an application program for displaying data such as the telephone directory data on the display device 14 (the application program will be referred to as "display application 153"). The display application 153 will be described below with reference to FIG. 5. As shown in FIG. 5, the display application 153 has a digital signature 153$a$ and a public key certificate 153$b$.

The digital signature 153$a$ is an electronic signature issued and added by a certification organization being a third party, in order to ensure the validity of the display application 153 and clearly demonstrate the place of origin thereof. The digital signature 153$a$ is preferably an encrypted signature in view of prevention of leakage.

The public key certificate 153$b$ has Extension (extended zone) 153$c$ according to the predetermined specification (e.g., the specification compliant with X.509) set by ITU-T. The Extension 153$c$ contains a record of the privilege information 153$d$ which is to be collated with the access list 152$a$ held by the telephone directory management application 152 described above.

Returning again to FIG. 1A, the storage device 15 stores a fingerprint authentication application 154 for performing execution and control of the fingerprint reader 17 described later. This fingerprint authentication application 154 is based on tamper-resistant software, in order to secure high confidentiality and make falsification and abuse harder.

Characteristic points of a fingerprint of a principal registered as a user of the fingerprint authentication application 154 (normally, an owner of the portable terminal 10) are preliminarily registered as fingerprint information in the fingerprint authentication application 154 as the physical information storing means. The fingerprint information is data of characteristic points extracted from an image of a fingerprint of a finger for personal identification. The fingerprint authentication application 154 compares and collates the fingerprint information of the principal with the fingerprint information of the user outputted from the after-described fingerprint reader 17 in accordance with a command from the physical information identity determiner 114 of the control unit 11, to determine the identity of the user and the principal on the basis of the result thereof. This results in performing the personal identification of the user having made the access request (e.g., a display request or a call origination request) to the telephone directory data.

The radio communication device 16 performs control of radio communication with a base station B. The control of radio communication encompasses origination of a call to a telephone number read out of the telephone directory database 151. Specifically, the radio communication device 16 is a circuit having a modem (not shown) for modulating and demodulating signals, and a codec (not shown) for coding and decoding signals, and is provided with an antenna A. The antenna A is retractably disposed at the top part of a housing of the portable terminal 10 and is used for transmission and reception of radio waves to and from the base station B.

The fingerprint reader 17 is comprised of a reading part and an extracting part. The fingerprint reader 17 is configured to extract characteristic points from an image of a fingerprint of a user's finger read by the reading part, according to the fingerprint authentication application 154 retrieved from the storage device 15, and to output them as fingerprint information of the user to the fingerprint authentication application 154.

The sound processing device 18 is comprised of a converter, an amplifier, etc. and is provided with a microphone M and a speaker S. The sound processing device 18 is configured to convert audio data from the control unit 11 into analog signals by the converter and emit sound from the speaker S through the amplifier, during calls. The sound processing device 18 also converts audio signals from the microphone M into digital signals by the converter and outputs the digital signals to the control unit 11, during calls.

The operation of the portable terminal 10 according to the present invention will be described below, together with an access control method according to the present invention. The steps described below are implemented when the control unit 11 executes the various programs stored in the storage device 15 illustrated in FIG. 1A.

Figure 6:
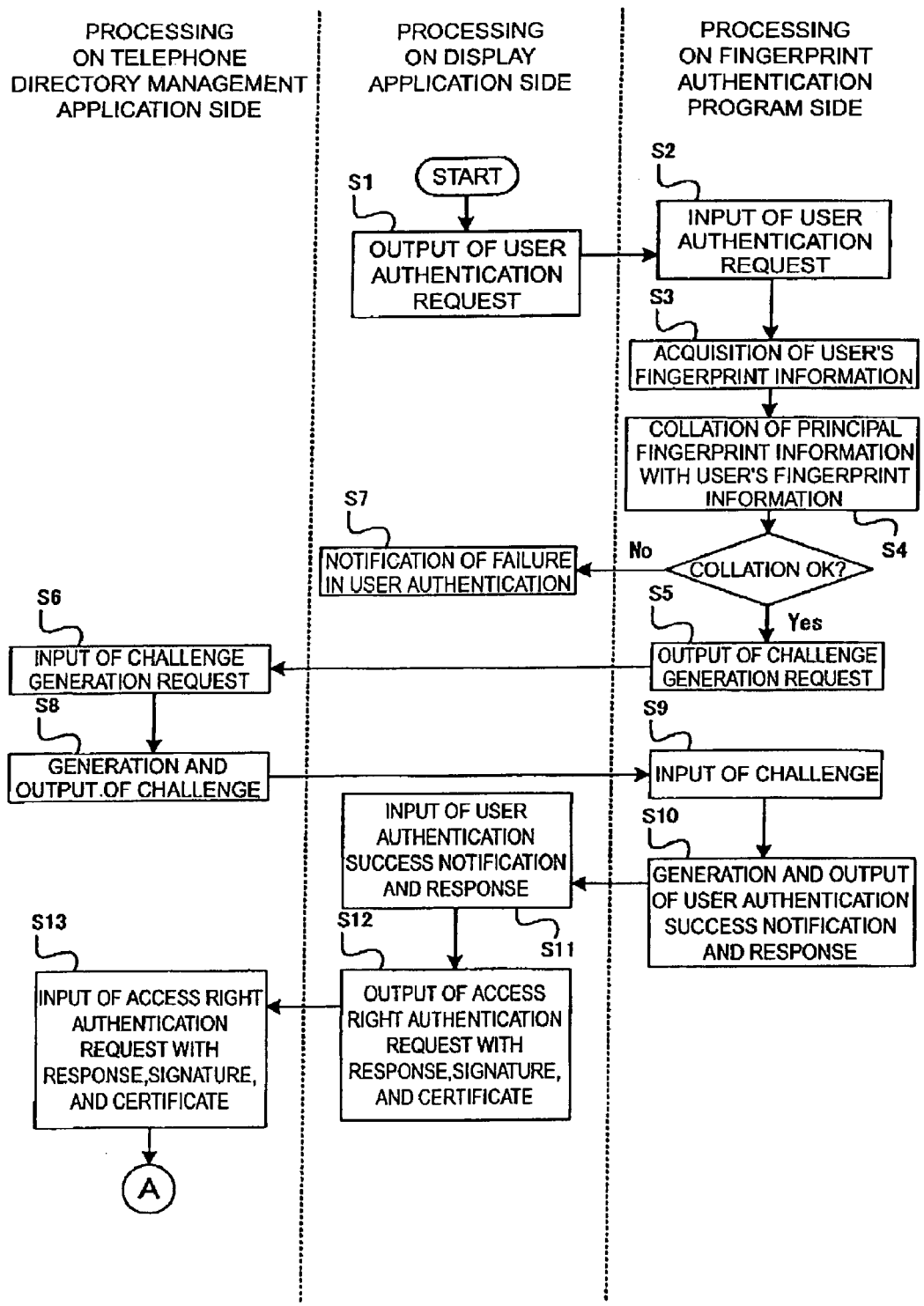
FIG. 6 is a flowchart showing a portion of the access control processing executed by the portable terminal.

FIG. 6 is a flowchart showing the flow of the access control processing executed by the portable terminal 10. The description of the operation is based on the premise that the telephone directory management application 152 and the fingerprint authentication application 154 share a given private key (not shown) in advance.

With an access request to the telephone directory management application 152, a user authentication request is first outputted from the display application 153 to the fingerprint authentication application 154 (S1). The access request herein is a access request from the display application 153, but the access request from the display application 153 via the control unit 11 also encompasses a access request made through the input device 12 by the user, of course.

When the user authentication request outputted in S1 is fed into the fingerprint authentication application 154 (S2), the fingerprint authentication application 154 starts reading the fingerprint of the user of the portable terminal 10 by the fingerprint reader 17. Characteristic points satisfying predetermined conditions are extracted from the image of the read fingerprint and are acquired as a user's fingerprint information item (S3).

In S4, the fingerprint information item of the principal preliminarily registered in the fingerprint authentication application 154 is compared and collated with the fingerprint information item of the user acquired in S3, to determine the identity of the fingerprint information items. When the collation results in determining that the fingerprint information items are identical with each other, a request to generate a random number (hereinafter referred to as "Challenge") is outputted from the fingerprint authentication application 154 to the telephone directory management application 152 (S5). The Challenge generation request thus outputted is fed into the telephone directory management application 152 (S6).

On the other hand, if the collation in 54 results in determining that the fingerprint information items are different from each other, a message is outputted from the fingerprint authentication application 154 to the display application 153 (S7). This message is data to notify the user of the portable terminal 10 that the user authentication ended in failure and the access request was rejected.

Subsequently, the telephone directory management application 152 generates a Challenge and outputs it to the fingerprint authentication application 154 (S8). The Challenge outputted in S8 is fed into the fingerprint authentication application 154 (S9).

Subsequently, the fingerprint authentication application 154 generates a result (hereinafter referred to as "Response") of calculation of Challenge using the private key shared with the telephone directory management application 152 in advance and a predetermined one-way function (e.g., Keyed Hash or the like). The Response thus generated is outputted along with a user authentication success notification indicating that the personal identification was successfully completed, to the display application 153 (S10).

The above user authentication success notification and Response outputted in S10 are fed into the display application 153 (S11). In conjunction therewith, the display application 153 outputs an access right authentication request to the telephone directory management application 152, toward the telephone directory management application 152. The access right authentication request is outputted along with the digital signature 153a and public key certificate 153b read out of the display application 153 and with the above Response (S12).

Figure 7:
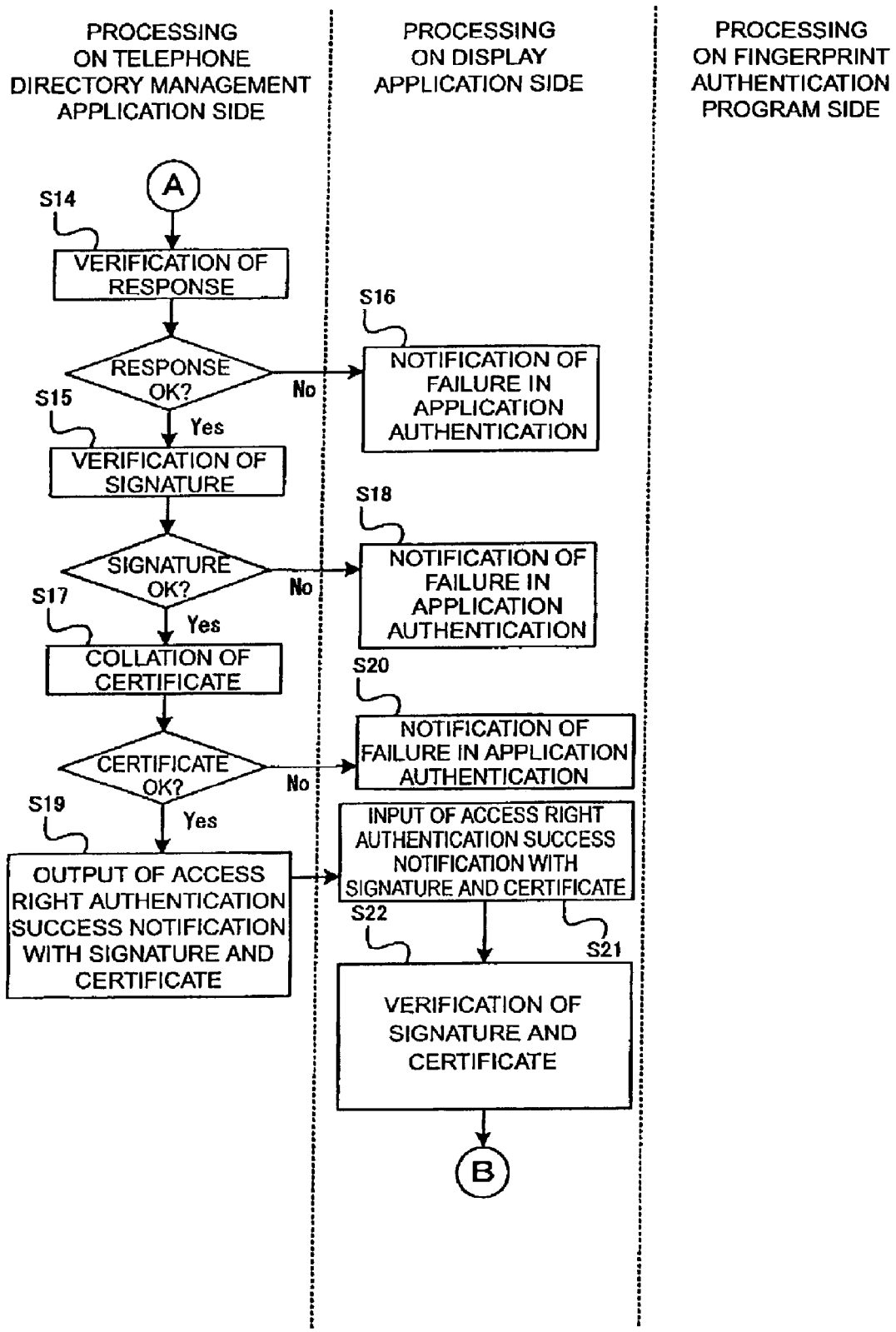
FIG. 7 is a flowchart showing a portion of the access control processing executed by the portable terminal.
Figure 8:
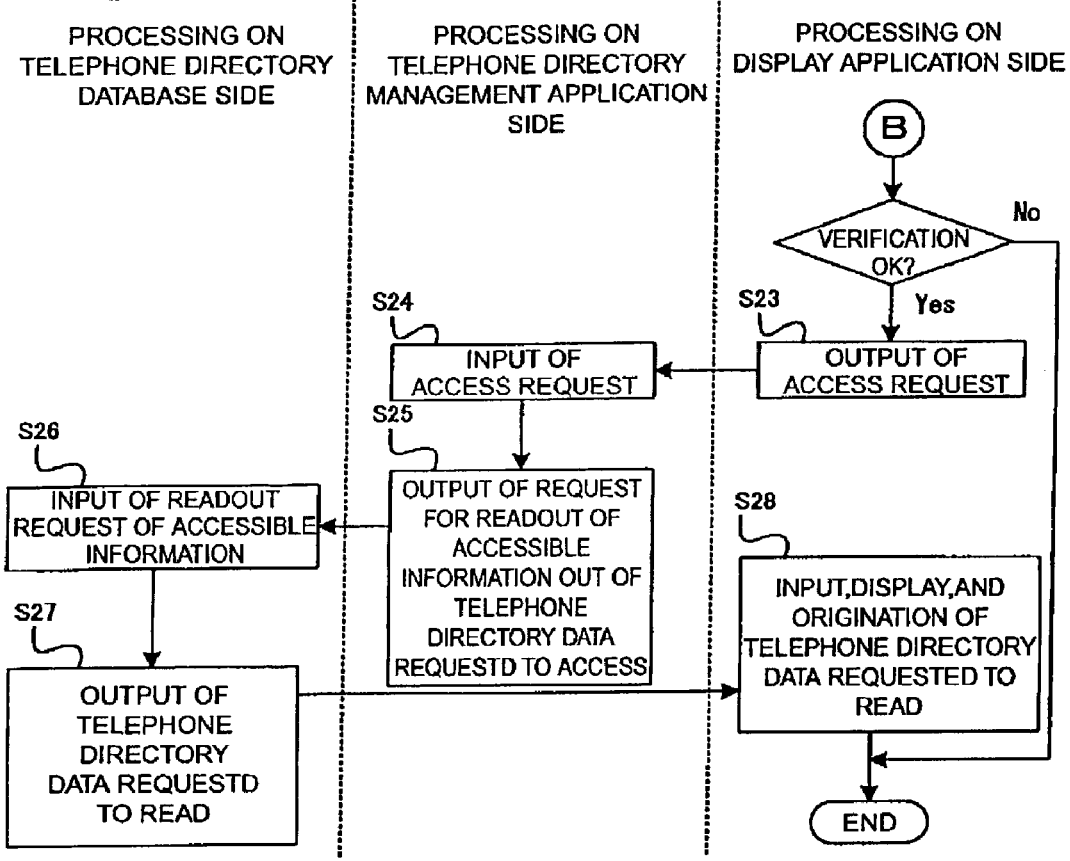
FIG. 8 is a flowchart showing a portion of the access control processing executed by the portable terminal.

Then the access right authentication request outputted in S12 is fed along with the digital signature 153a and public key certificate 153b and with the Response into the telephone directory management application 152 according to a command of the access right authentication request acquirer 111 of the control unit 11 (S13), whereupon the telephone directory management application 152 starts verification of the Response (transferring to S14 in FIG. 7). The verification of the Response is conducted with reference to the aforementioned private key shared between the telephone directory management application 152 and the fingerprint authentication application 154 in advance.

When the verification in S14 results in determining that the Response is valid, i.e., that it was generated based on the Challenge generated by the telephone directory management application 152, then the telephone directory management application 152 performs verification of the digital signature 153a (S15). On the other hand, if the verification in S14 results in determining that the Response is invalid, the telephone directory management application 152 outputs a message to the display application 153 (S16). This message is one to notify the user that the application program authentication ended in failure and the access request was rejected.

When the verification in S15 results in determining that the digital signature 153a is valid, the telephone directory management application 152 compares and collates the public key certificate 153b entered in S13, with the certificate stored in the Subject area 152d of the access list 152a in accordance with a command from the authentication information validity determiner 112 of the control unit 11 (817). On the other hand, if the verification in S15 results in determining that the digital signature 153a is invalid, the user is notified of the message indicating that the access request was rejected (518), as in the case of the process of S16.

Furthermore, when the result of the collation in S17 is that the public key certificate 153b agrees with one of the certificates stored in the Subject area 152d, the telephone directory management application 152 outputs an access right authentication success notification indicating that the authentication of the access right was successfully completed, along with the digital signature 152b and public key certificate 152c to the display application 153 (S19).

On the other hand, when the result of the collation in S17 is that the public key certificate 153b disagrees with all the certificates stored in the Subject area 152d of the access list 152a, the message indicating that the access request was rejected is outputted to the display application 153, as indicated in S20.

Receiving the above access right authentication success notification, digital signature 152b, and public key certificate 152c (S21) outputted in S19, the display application 153 performs the verification of the digital signature 152b and public key certificate 152c (S22). When the verification results in determining that the digital signature 152b is present and the public key certificate 152c is valid, the display application 153 outputs an access request to the telephone directory management application 152 (S23).

When the access request outputted in S23 is fed into the telephone directory management application 152 (S24), the telephone directory management application 152 outputs a request to read the accessible information selected out of the telephone directory data requested to access, to the telephone directory database 151 (S25). The selection of the accessible information is carried out with reference to the data stored in the accessible information area 152f.

For example, in the case where the public key certificate 153b is data identical with the certificate held by the application B, the corresponding accessible information is "all telephone directory data belonging to group B." Therefore, the request to be outputted is a request to read all the data corresponding to "B" in the group name storage area 151e, i.e., the names, kana characters, telephone numbers, and mail addresses of names "ΔΔ jiro" and "xx saburo," out of the data stored in the telephone directory database 151 (cf. FIG. 2).

When the reading request of the accessible information outputted in S25 is fed into the telephone directory database 151 (S26), the telephone directory data (accessible information) selected in S25 is read as display target data out of the telephone directory database 151. Then the telephone directory data output 113 of the control unit 11 outputs the telephone directory data thus read, to the display application 153 (S27).

Then the telephone directory data outputted from the telephone directory database 151 in S27 is fed into the display application 153, and the display application 153 displays it on the display device 14 of the portable terminal 10 (S28). The portable terminal may be configured so that when the telephone directory data contains a telephone number, the radio communication device 16 originates a call to the telephone number. Furthermore, the portable terminal may also be configured so that when the telephone directory data contains a mail address, the radio communication device 16 sends an e-mail letter to the mail address.

As described above, the portable terminal 10 according to the present invention is provided with the telephone directory database 151 as the telephone directory data storing means and with the control unit 11 as the request acquiring means, verifying means, and output means. The request acquiring means acquires the access right authentication request from the display application 153 to the telephone directory management application 152 managing the telephone directory data stored in the telephone directory database 151, along with the digital signature 153a and public key certificate 153b (corresponding to the application authentication information) held by the display application 153. The verifying means determines the validity of the application authentication information in accordance with the access right authentication request. When it is determined that the application authentication information is valid, the output means admits the access right authentication request and outputs the telephone directory data to the display application 153 in accordance with the access request to the telephone directory data.

Namely, the portable terminal 10 admits the access right authentication request from the application program with the valid digital signature and public key certificate, but rejects the access right authentication request from the application program without valid application authentication information. Then the portable terminal 10 admits the request for access to the telephone directory data from the application program whose access right authentication request was admitted. This makes it feasible to implement the access to the telephone directory data from the application programs while maintaining high security in the portable terminal 10.

Specifically, the telephone directory management application 152 is provided with the access list 152a, whereby it becomes feasible to perform the access control (including exclusive access control) similar to that in the case where access rights are set in telephone directory data units. The display application 153 is provided with the digital signature 153a and public key certificate 153b, whereby it becomes feasible to implement the access control similar to that in the case where access rights are set in application program units. Furthermore, the Response reflecting the result of determination of identity of fingerprint information is used for the user authentication, whereby it becomes feasible to implement the access control similar to that in the case where access rights are set in user units.

Although the telephone directory database 151 exists in the non-tamper area in which it is normally difficult to perform individual access control in data units, in application units, in user units, etc., it is feasible to perform fine access control on such telephone directory data existing in the non-tamper area.

Figure 9:
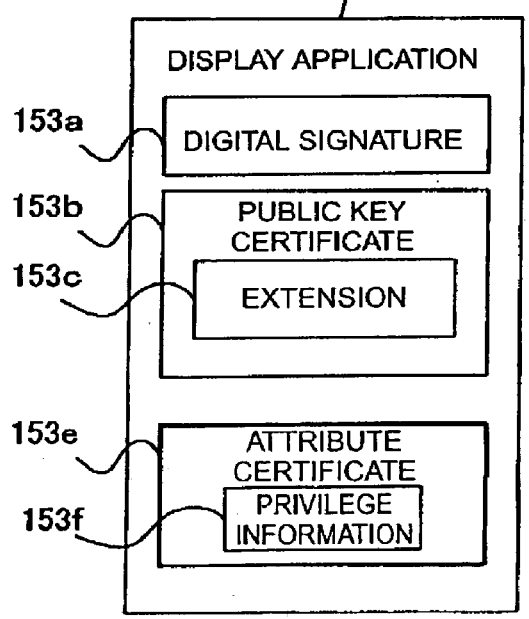
FIG. 9 is a conceptual diagram showing another configuration example of the display application.

It is noted herein that the contents of the description in the present embodiment are just a preferred example of the portable terminal according to the present invention and the invention is not limited to this example. A display application 153 stored in the storage device 15 of the portable terminal 10, which is a modification of the present embodiment, will be described below with reference to FIG. 9. As shown in FIG. 9, the display application 153 further has an attribute certificate 153*e*, in addition to the digital signature 153*a* and public key certificate 153*b*.

The digital signature 153*a* and public key certificate 153*b* are much the same as the digital signature 153*a* and public key certificate 153*b*, which were described with reference to FIG. 5, and thus the description thereof is omitted herein with the same constituent portions given the same reference symbols. The attribute certificate 153*e* is a known attribute certificate issued by a certification organization different from the issuer of the public key certificate 153*b* and defined according to the predetermined specification (e.g., the specification compliant with X.509) set by ITU-T, as in the case of Extension 153*c*. The attribute certificate 153*e* contains a description of information to enable reference to the public key certificate 153*b*.

The portable terminal 10 refers to privilege information 153*f* of the attribute certificate 153*e* on the occasion of executing the collation process between the certificate and the access list (S17 in FIG. 7). If the privilege information is described in Extension 153*c*, the privilege information is fixed within a period of validity of the public key certificate 153*b*. For this reason, in order to modify the contents of the description of the privilege information, there is need for a procedure of reissuing the public key certificate. In contrast to it, the attribute certificate 153*e* allows the user to set a period of validity independent of the public key certificate 153*b*, and thus the privilege information described therein is readily modified.

The portable terminal 10 does not have to be limited to the cellular phones, but it may be any electronic device with the communication function, such as PHS (Person Handyphone System) terminals and others.

Described last are a program for implementing the access control technology according to the present invention and a computer-readable recording medium (hereinafter referred to simply as "recording medium") in which the foregoing program is recorded. The recording medium is a medium that can induce change states of energy such as magnetism, light, electricity, or the like according to the description contents of a program against a reading device installed as one of hardware resources of general-purpose computers or the like and that can transmit the description contents of the program to the reading device in the format of signals corresponding to the change states. Such recording media include, for example, those detachably mounted on computers (including the portable terminals, PHS terminals, etc.) like the IC cards of UIM (User Identity Module) and others, magnetic disks, optical disks, and magnetooptical disks, and nonvolatile semiconductor memories such as HDs (Hard Disks) fixedly incorporated in the computers, firmware integrally fixed in the computers, and so on.

The above program may be configured so that part or the whole thereof is transmitted through a transmission medium such as a communication line or the like from another device to be received by the radio communication device of the portable terminal according to the present invention and recorded therein. Conversely, the above program may also be configured to be transmitted from the portable terminal according to the present invention through the transmission medium to another device to be installed therein.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A portable terminal comprising:
   telephone directory data storing means for storing telephone directory data;
   request acquiring means for acquiring an access right authentication request to a telephone directory management application program managing said telephone directory data stored in the telephone directory data storing means, from another application program which is downloaded into the portable terminal, along with application authentication information held by said application program;
   verifying means for determining validity of the application authentication information in accordance with the access right authentication request acquired by said request acquiring means; and
   output means configured so that when the verifying means determines that the application authentication information is valid, the output means admits the access right authentication request and outputs the telephone directory data to the application program in accordance with a request for access to the telephone directory data.

2. The portable terminal according to claim 1, wherein said application authentication information includes a digital signature and a public key certificate.

3. The portable terminal according to claim 2, wherein said application authentication information further includes an attribute certificate.

4. The portable terminal according to claim 2, wherein said digital signature is an electronic signature issued and added by a third party certification organization.

5. The portable terminal according to claim 2, wherein said digital signature comprises a place of origin thereof.

6. The portable terminal according to claim 5, wherein said digital signature is encrypted.

7. The portable terminal according to claim 1, further comprising:
   physical information storing means for storing a physical information item indicating a physical feature of a principal; and
   determining means for collating the physical information item stored in said physical information storing means, with a physical information item of a user having made said access right authentication request, to determine the identity of the physical information items,
   wherein when said determining means determines that said physical information items are identical with each other, said request acquiring means acquires user authentication information reflecting the result of the determination,
   wherein said verifying means determines validity of the user authentication information in accordance with the access right authentication request acquired by the request acquiring means, and
   wherein when said verifying means determines that the user authentication information is valid, said output means admits the access right authentication request and outputs the telephone directory data to the application program in accordance with the request for access to the telephone directory data.

8. The portable terminal according to claim 7, wherein said physical information items are fingerprint information items.

9. The portable terminal according to claim 7, wherein said physical information item is an iris information item.

10. The portable terminal according to claim 7, wherein said physical information item is a retina information item.

11. The portable terminal according to claim 7, wherein said physical information item is a voice spectrum information item.

12. The portable terminal according to claim 7, wherein said physical information item is a face image information item.

13. The portable terminal according to claim 1, wherein said access right authentication request is a display right authentication request of the telephone directory data to the telephone directory management application program,
wherein said access request is a request for display of the telephone directory data, and
wherein said output means makes display means display the telephone directory data in accordance with the display request.

14. The portable terminal according to claim 1, wherein said access right authentication request is a request for authentication of a call origination right to a telephone number included in the telephone directory data, to said telephone directory management application program, wherein said access request is a request for origination of a call to said telephone number, and
wherein said output means has a call originated to the telephone number in accordance with the call origination request.

15. The portable terminal according to claim 1, wherein said telephone directory data storing means comprises a first area for storing Chinese characters and a second area for storing kana characters indicating the reading of the Chinese characters or English notation English notations corresponding to the Chinese characters.

16. The portable terminal according to claim 15, wherein said telephone directory data is encrypted.

17. The portable terminal according to claim 1, wherein said telephone directory data is encrypted.

18. The portable terminal according to claim 1, wherein said telephone directory data storing means is located in a non-tamper area.

19. An access control method in which a portable terminal acquires an access request from an application program, said access control method comprising:
a request acquiring step wherein the portable terminal acquires an access right authentication request to a telephone directory management application program managing a telephone directory data stored in telephone directory data storing means of the portable terminal, from another application program which is downloaded into the portable terminal, along with application authentication information held by said application program;
a verifying step wherein the portable terminal determines validity of the application authentication information in accordance with the access right authentication request acquired in the request acquiring step; and
an output step wherein when it is determined in the verifying step that the application authentication information is valid, the portable terminal admits the access right authentication request and outputs the telephone directory data to the application program in accordance with a request for access to the telephone directory data.

20. A computer program product for storing instructions for execution by a processor, which when executed by the processor, causes the processor to make a portable terminal configured to acquire an access request from an application program perform processes comprising:
a acquiring an access right authentication request to a telephone directory management application program managing the telephone directory data stored in telephone directory data storing means of the portable terminal, from another application program which is downloaded into the portable terminal, along with application authentication information held by said application program;
determining validity of the application authentication information in accordance with the access right authentication request thus acquired; and
admitting the access right authentication request when it is determined that the application authentication information is valid, and outputting the telephone directory data to the application program in accordance with the access request to the telephone directory data.

* * * * *

UNITED STATES PATENT AND TRADEMARK OFFICE
CERTIFICATE OF CORRECTION

PATENT NO. : 7,031,695 B2 Page 1 of 1
APPLICATION NO. : 10/420844
DATED : April 18, 2006
INVENTOR(S) : Aono et al.

It is certified that error appears in the above-identified patent and that said Letters Patent is hereby corrected as shown below:

On the title page, Item (73), should read:

-- (73)  Assignee: NTT DoCoMo, Inc., Tokyo (JP) --

Signed and Sealed this

Eleventh Day of July, 2006

JON W. DUDAS
*Director of the United States Patent and Trademark Office*